United States Patent [19]
Haga et al.

[11] Patent Number: 5,638,912
[45] Date of Patent: Jun. 17, 1997

[54] HYDRAULIC POWER STEERING APPARATUS

[75] Inventors: Kyosuke Haga, Anjo; Mikio Suzuki, Hekinan; Katsuhisa Mori, Okazaki, all of Japan

[73] Assignee: Toyoda Koki Kabushiki Kaisha, Kariya, Japan

[21] Appl. No.: 339,229

[22] Filed: Nov. 10, 1994

[30] Foreign Application Priority Data

Nov. 12, 1993 [JP] Japan ............... 5-2833337

[51] Int. Cl.⁶ ............................................. B62D 5/083
[52] U.S. Cl. ................. 180/417; 180/421; 180/439; 180/441
[58] Field of Search .................. 180/132, 141, 180/142, 149, 417, 421, 429, 441, 442, 439

[56] References Cited

U.S. PATENT DOCUMENTS 4,577,660  3/1986  Haga et al. ............... 137/625.24

FOREIGN PATENT DOCUMENTS

| 0083490 | 7/1983 | European Pat. Off. . | |
|---|---|---|---|
| 0594137 | 4/1994 | European Pat. Off. . | |
| 2375474 | 7/1978 | France . | |
| 5042880 | 2/1993 | Japan ............... | 180/132 |
| 5310136 | 11/1993 | Japan ............... | 180/132 |
| 6127398 | 5/1994 | Japan ............... | 180/132 |
| 6127399 | 5/1994 | Japan ............... | 180/132 |
| 2249070 | 4/1992 | United Kingdom . | |

Primary Examiner—Anne Marie Boehler
Attorney, Agent, or Firm—Oblon, Spivak, McClelland, Maier & Neustadt, P.C.

[57] ABSTRACT

A power steering apparatus is composed a fluid source for discharging pressurized fluid, a power cylinder, a control valve responsive to operation of a steering wheel for supplying the power cylinder with pressurized fluid from the fluid source, and a reservoir. The control valve has a first control portion for controlling the flow of pressurized fluid from the fluid source to the reservoir, and a second control portion for controlling the flow of pressurized fluid to the power cylinder. The first control portion has four paths communicating with the fluid source and the reservoir, and each of the four paths is formed with a center-open variable orifice which opens when the control valve is in a neutral state. The second control portion has two supply paths communicating with the fluid source and a pair of chambers of the power cylinder, each of the two supply paths is formed with a semi-center-open variable orifice which opens when the control valve is in the neutral state, and two drain paths communicating with the chambers of the power cylinder and the reservoir, each of the two drain paths is formed with a center-closed variable orifice of which closes when the control valve is in the neutral state.

8 Claims, 7 Drawing Sheets

HYDRAULIC POWER STEERING APPARATUS

BACKGROUND OF THE INVENTION

1. Field of the Invention

The present invention relates to a hydraulic power steering apparatus suitable for use in automobiles and the like, and more particularly, it relates to the improvement of a hydraulic power steering apparatus described in the co-pending U.S. application Ser. No. 08/138,963 of the same assignee as this application.

2. Discussion of Related Art

In a conventional power steering apparatus, center-open type variable orifices arranged in a rotary control valve operate immediately to supply the pressurized fluid to one of power cylinder chambers and to exhaust the fluid from the other power cylinder chamber even when a steering wheel is turned slightly from the neutral position. This causes the differential pressure across a power cylinder to begin to increase immediately and to increase more gradually as the rotational angle of the rotary control valve further increases. Accordingly, the conventional power steering apparatus does not give the driver a steady steering feeling at around the neutral position.

CROSS REFERENCE TO THE CO-PENDING APPLICATION

The assignee of this application has proposed in the aforementioned co-pending application a power steering apparatus which is designed to increase the rigidity of the steering wheel at around the neutral position by preventing the differential pressure across the power cylinder from increasing when the steering wheel is at around the neutral position.

The power steering apparatus as proposed therein is composed of an engine-driven pump 50, a reservoir 51, a power cylinder 52 for assisting the steering operation, and a rotary control valve 53, as shown in FIG. 1. The rotary control valve 53 fluidly controls pressurized fluid which is supplied from the pump 50 to the power cylinder 52, upon rotation of the steering wheel (not shown). The control valve 53 is composed of a first control portion having semi-center-open variable orifices V1–V4 (shown in FIG. 4), and a second control portion having semi-center-open variable orifices V5 and V6 (shown in FIG. 5) communicating to the reservoir 51 and center-closed variable orifices V7 and V8 (shown in FIG. 6) communicating to the pump 50.

The opening area of each of the variable orifice V1–V8 is varied in correspondence with the relative rotational angle (valve rotational angle) between a valve shaft 61 and a valve body 62, as shown in FIG. 7.

In the above-mentioned constitution, since the center-closed variable orifices V7 and V8 are closed in the neutral state of the steering operation, the pressurized fluid is not supplied to the power cylinder 52. In such a state, both of fluid chambers 52A and 52B of the power cylinder 52 are in communication with the reservoir 51 through the semi-center-open variable orifices V5 and V6, so that the pressures in the fluid chambers 52A and 52B are maintained so as to be extremely low or substantially zero. Accordingly, the pressurized fluid discharged from the pump 50 is drained to the reservoir 51 through the center-open variable orifices V1–V4 of the first control portion.

When the valve shaft 61 is rotated relative to the valve body 62 by a slight distance in a rightward direction in FIG. 1 upon rotation of the steering wheel, the opening areas of the variable orifices V2 and V3 of the first control portion are enlarged while those of the variable orifices V1 and V4 thereof are diminished. In such a state, although the pressure of the pump 50 increases gradually, the variable orifices V7 and V8 of the second control portion remains closed until the valve rotational angle reaches $\theta_1$, so that the differential pressure between the both fluid chambers 52A and 52B of the power cylinder 52 is maintained so as to be zero. Therefore, within the non-sensitive zone wherein the valve rotational angle is smaller than $\theta_1$, the differential pressure between the both fluid chambers 52A and 52B can be prevented from increasing, which provides the same steering feeling as that of a manual steering apparatus, so that the rigidity of the steering wheel at around the neutral position can be increased.

As the valve rotational angle exceeds $\theta_1$, the center-closed variable orifice V8 of the second control portion communicating with the pump 50 begins to open. At this time, since the opening area of the variable orifice V6 communicating with the reservoir 51 is reduced, the pressure in the fluid chamber 52B is increased. With this operation, the differential pressure is generated between the both fluid chambers 52A and 52B to assist the steering operation.

When the steering wheel is returned, on the other hand, the rotary control valve 53 comes back to the neutral position. In such a state, a flow passage leading to the both fluid chambers 52A and 52B of the power cylinder 52 is closed by the center-closed variable orifices V7 and V8. Although the supply of the pressurized fluid from the pump 50 to the fluid chamber 52A low in the pressure is possible through the center-open variable orifices V2 and V4 and the semi-center-open variable orifice V5, such supply is delayed due to the resistances of the variable orifices V2, V4 and V5 in the line of the flow passage, which causes the delay in the returning of the steering wheel.

SUMMARY OF THE INVENTION

Accordingly, a primary object of the present invention is to provide an improved power steering apparatus capable of providing a driver with an improved steering feeling.

Another object of the present invention is to provide an improved power steering apparatus capable of improving the return of a steering wheel.

A further object of the present invention is to provide an improved power steering apparatus capable of reducing energy consumption.

Briefly, the present invention provides a power steering apparatus having a fluid source for discharging pressurized fluid, a power cylinder, a control valve responsive to operation of a steering wheel for supplying the power cylinder with pressurized fluid from the fluid source, and a reservoir. The control valve is composed of first and second control portions. The first control portion has at least one path connecting the fluid source and the reservoir. The path of the first control portion is formed with a center open variable orifice which opens when the control valve is in a neutral state, to control the flow of pressurized fluid from the fluid source to the reservoir. The second control portion has two supply paths making the fluid source communicate respectively with a pair of chambers of the power cylinder and two drain paths respectively making the chambers of the power cylinder communicate with the reservoir, to control the flow of pressurized fluid from the fluid source to the power cylinder. When the control valve is in the neutral state, the two supply paths each formed with a center open variable orifice remain open, while the two drain paths each formed with a center-closed variable orifice remain closed.

In the power steering apparatus having the above-mentioned constitution, the differential pressure across the power cylinder is maintained so as to be extremely low or substantially zero when the steering wheel is at around the neutral position. Therefore, at around the neutral position of the steering wheel, the steering feeling is the same as that in a manual (or no power assisted) steering apparatus, so that the driver can definitely feel the neutral position of the steering wheel, i.e., the resistance to turn the same is enhanced at around the neutral position. This also enables the driver to feel the beginning of power assistance when the steering wheel is turned in either direction beyond a certain valve rotational angle from the neutral position.

Further, when the steering wheel is returned with the control valve being in the neutral state, the two drain paths of the second control portion communicating with the reservoir are closed by the center-closed variable orifices. However, at this time, one of the fluid chambers of the power cylinder is in communication with the other thereof through the semi-center-open variable orifices of the second control portion, which permits the fluid to flow between the power cylinder chambers, so that the return of the steering wheel can be improved.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
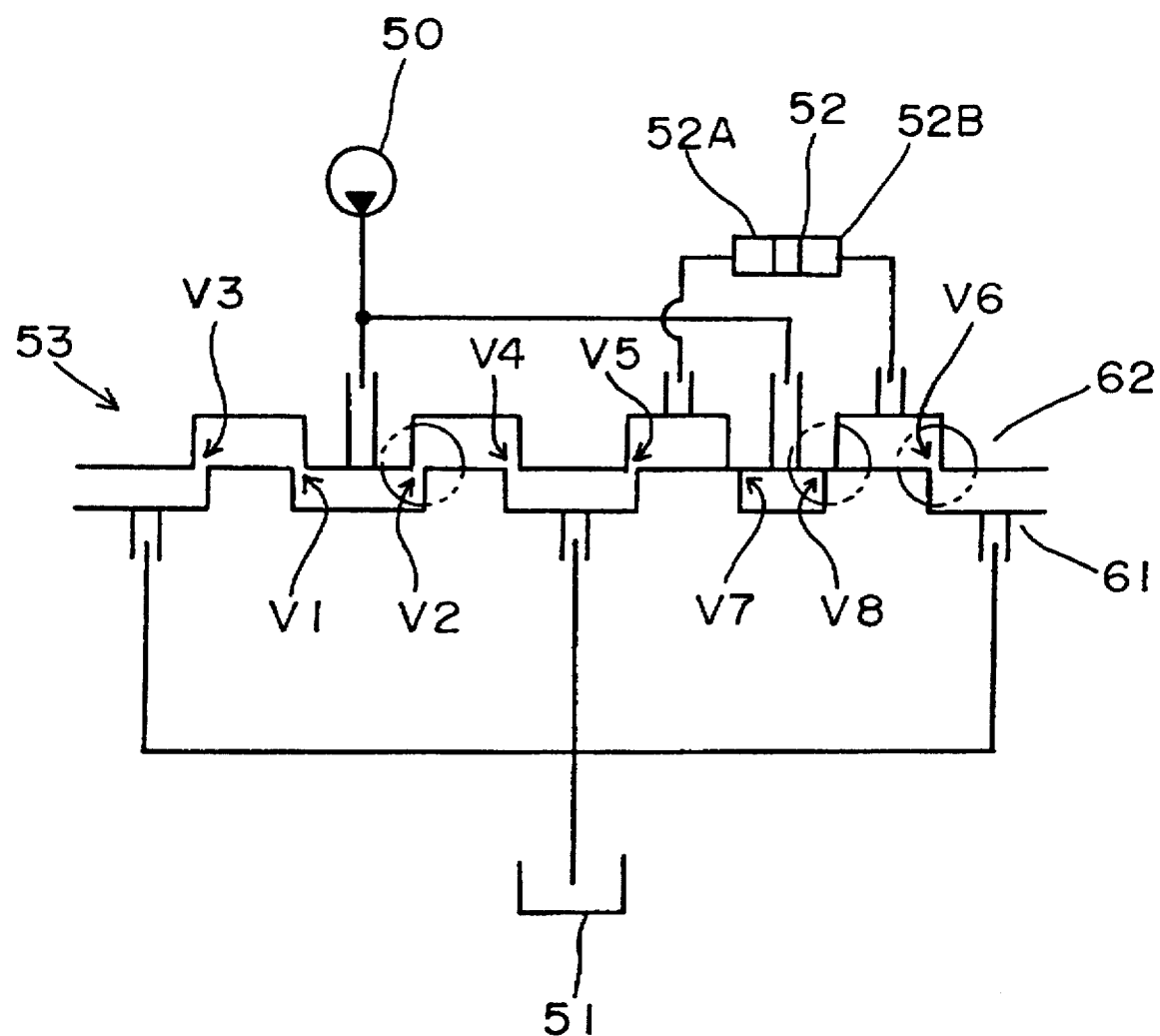
FIG. 1 is a diagram showing a power steering apparatus proposed in the aforementioned co-pending application, with a rotary control valve enlarged partly.
Figure 2:
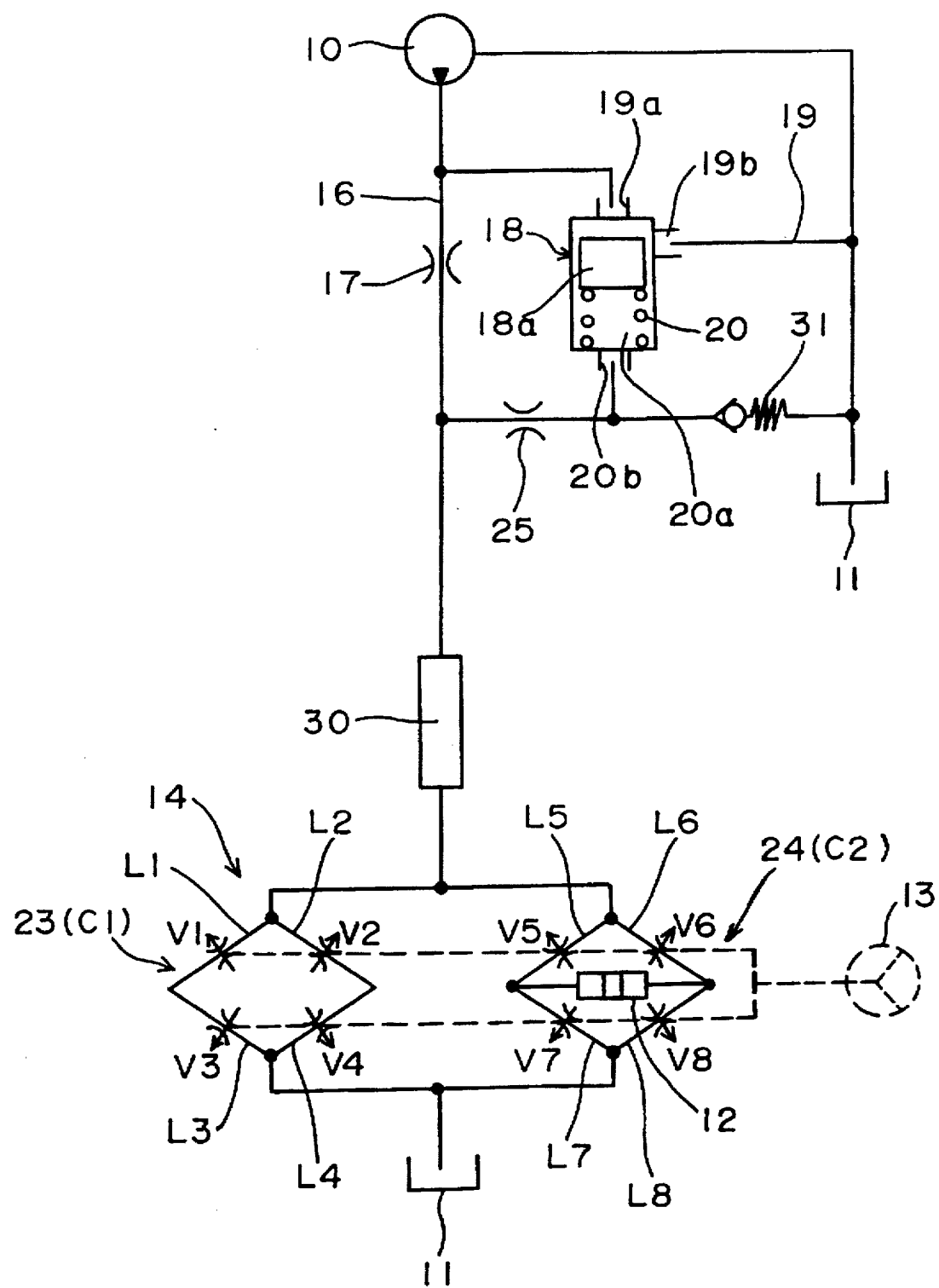
FIG. 2 is a diagram showing a power steering apparatus according to a first embodiment of the present invention.

Referring now to FIG. 2, a hydraulic power steering apparatus according to the present invention is mainly composed of a pump 10 which is driven by an automotive engine not shown, a reservoir 11, a power cylinder 12 for assisting the steering operation, a rotary control valve 14, and a flow control valve 18. The rotary control valve 14 is responsive to rotation of a steering wheel 13 so as to control the flow of pressurized fluid from the pump 10 to the power cylinder 12.

The flow control valve 18 is composed of a valve spool 18a and a spring 20 which is disposed in a spring chamber 20a formed at the back of the valve spool 18a. The flow control valve 18 is disposed in a bypass passage 19, and the flow of fluid from an inlet port 19a to an outlet port 19b of the flow control valve 18 is controlled by the valve spool 18a. A port 20b of the spring chamber 20a is connected to a supply passage 16 via a control orifice 25 and to the reservoir 11 via a relief valve 31. The valve spool 18a is movable in response to the differential pressure across a metering orifice 17 disposed in the supply passage 16 which connects the pump 10 to the rotary control valve 14. Thus, the bypass passage 19 is opened and closed by the valve spool 18a in response to the differential pressure across the metering orifice 17 so as to maintain the flow rate of pressurized fluid supplied to the rotary control valve 14 substantially constant. The valve spool 18a is urged by the spring 20 in a direction to close the bypass passage 19.

Figure 3:
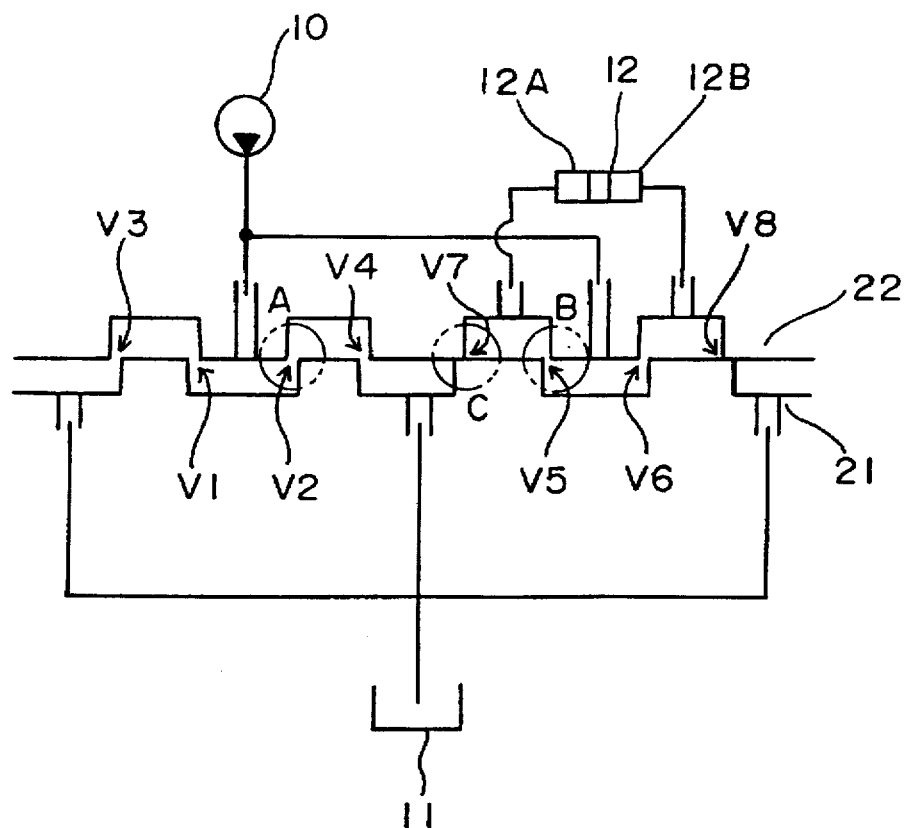
FIG. 3 is a diagram similar to FIG. 1, of the apparatus in the first embodiment shown in FIG. 2.

The rotary control valve 14, shown as an enlarged development view in FIG. 3, is composed of a valve shaft 21 coupled to the steering wheel 13 for rotation therewith, a valve body 22 arranged to surround the valve shaft 21 in a coaxial relationship therewith, a torsion bar (not shown) connecting the valve shaft 21 to the valve body 22 in the manner that they are relatively rotatable within a limited angle, and a valve housing (not shown) receiving the above-mentioned components therein. The valve body 22 is mechanically connected to a steering linkage to which hydraulic force generated by the power cylinder 12 is applied.

Each of the outer surface of the valve shaft 21 and the inner surface of the valve body 22 is provided with a plurality of axial slots, which are formed at predetermined intervals in the circumferential direction. Thus, two kinds of control portions, i.e., first control portion 23 and second control portion 24 are formed between the valve shaft 21 and the valve body 22 alternately at intervals of 90 degrees in the circumferential direction so as to control the flow of pressurized fluid.

Figure 4:
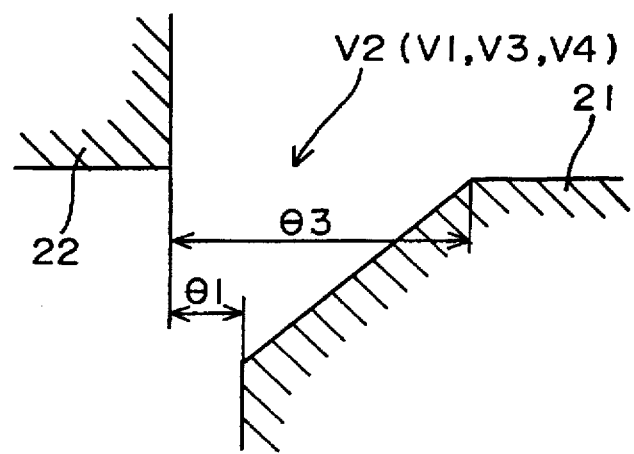
FIG. 4 is an enlarged view of the portion A in FIG. 3.
Figure 7:
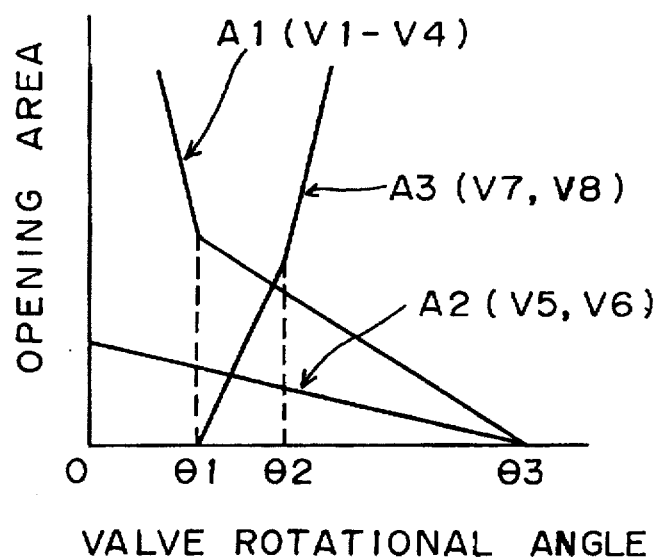
FIG. 7 is a graph showing the relationship between the relative rotational angle of the control valve and the effective opening areas of the variable orifices according to the first embodiment.

The first control portion 23 is composed of a first bridge circuit C1 having four fluid paths L1, L2, L3 and L4 which are connected to the pump 10 and the reservoir 11, and four variable orifices V1, V2, V3 and V4 are disposed in the middle of the fluid paths L1, L2, L3 and L4, respectively. Each of the variable orifices V1, V2, V3 and V4 comprise center-open variable orifices, and the initial state (neutral state) of which is shown in FIG. 4. Each of the variable orifices V1, V2, V3 and V4 has such a characteristic that the opening area of each orifice changes as illustrated by the line A1 in FIG. 7 with relative rotation (valve rotational angle) between the valve shaft 21 and valve body 22.

Figure 5:
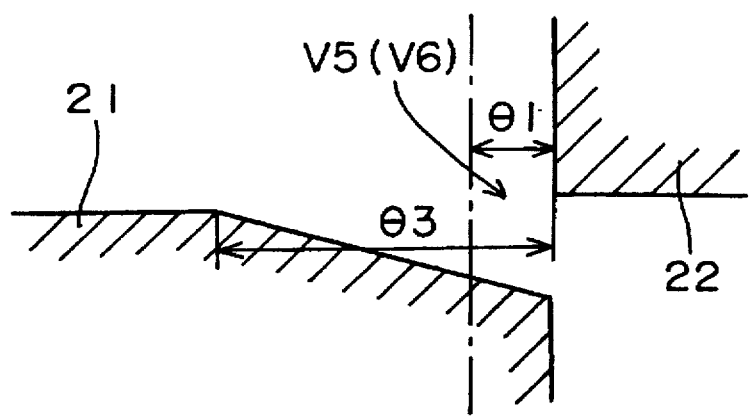
FIG. 5 is an enlarged view of the portion B in FIG. 3.
Figure 6:
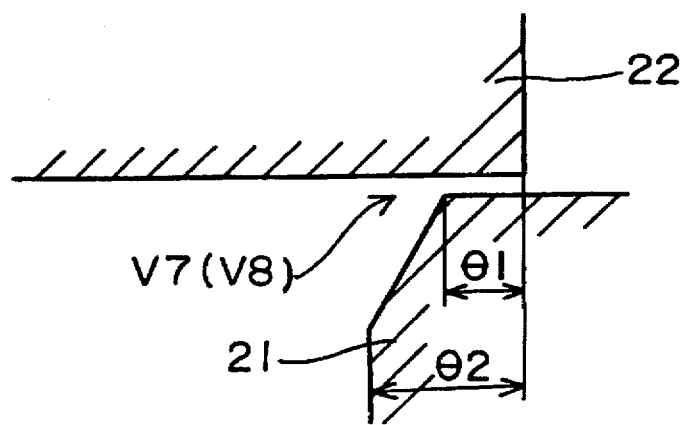
FIG. 6 is an enlarged view of the portion C in FIG. 3.

The second control portion 24 is composed of a second bridge circuit C2 having four fluid paths L5, L6, L7 and L8 which are connected to the pump 10, both fluid chambers 12A and 12B of the power cylinder 12 and the reservoir 11, and four variable orifices V5, V6, V7 and V8 are disposed in the middle of the fluid paths L5, L6, L7 and L8, respectively. Each of the variable orifices V5 and V6 communicating with the pump 10 comprise semi-center-open variable orifices, and the initial state of which is shown in FIG. 5. Each of the variable orifices V7 and V8 communicating with the reservoir 11 comprise center-closed variable orifices, the initial state of which is shown in FIG. 6. Each of the variable orifices V5 and V6 has such a characteristic that the opening area of each orifice changes as illustrated by the line A2 in FIG. 7 with the relative rotation between the valve shaft 21 and valve body 22. Each of the variable orifices V7 and V8 has such a characteristic that the opening area of each orifice changes as illustrated by the line A3 in FIG. 7 with the relative rotation between the valve shaft 21 and valve body 22.

In FIG. 2, numeral 30 indicates a supply hose for supplying pressurized fluid to the rotary control valve 14.

The operation of the power steering apparatus as constructed above will now be described.

When the operation of the pump 10 is initiated, pressurized fluid discharged from the pump 10 to the rotary control valve 14 is controlled by the metering orifice 17 and the flow control valve 18 to make substantially constant the flow rate and pressurized fluid at such flow rate is supplied to the first and second control portion 23 and 24.

When the steering wheel 13 is not rotated, i.e., when the rotary control valve 14 is at the neutral position, the center-closed variable orifices V7 and V8 of the second control portion 24 remain closed. In such a state, since the semi-center-open variable orifices V5 and V6 of the second control portion 24 remain opened, both of the fluid chambers 12A and 12B of the power cylinder 12 are in communication with each other through the semi-center-open variable orifice V5 and V6, and the pressurized fluid discharged from the pump 10 is equivalently supplied to both of the fluid chambers 12A and 12B. Accordingly, the pressures in both of the fluid chambers 12A and 12B are maintained substantially the same. On the other hand, the pressurized fluid supplied to the first control portion 23 is drained to the reservoir 11 through the center-open variable orifices V1, V2, V3 and V4.

When the valve shaft 21 is rotated slightly relative to the valve body 22, for example, in the rightward direction in FIG. 3 upon the steering operation, the opening areas of the variable orifices V2 and V3 of the first control portion 23 increase while the opening areas of the remaining variable orifices V1 and V4 decrease. Thus, the pressure of the fluid discharged from the pump 10, i.e., the supply pressure to the rotary control valve 14 gradually increases. The pressures in the fluid chambers 12A and 12B of the power cylinder 12 are gradually increased, but the differential pressure therebetween is maintained so as to be zero until the relative rotational angle of the rotary control valve 14 reaches θ1, because the center-closed variable orifices V7 and V8 of the second control portion 24 remain in the closed state until the relative rotational angle of the rotary control valve 14 reaches θ1. Accordingly, within the neutral zone wherein the relative rotational angle of the rotary control valve 14 is smaller than θ1, the differential pressure between the fluid chambers 12A and 12B of the power cylinder 12 is prevented from increasing, as illustrated by the solid curved line in FIG. 8. Namely, within the neutral zone, the steering feeling is the same as that in a manual (or no power assisted) steering apparatus, and the rigidity against rotation of the steering wheel 13 at around the neutral position can be increased.

When the relative rotational angle of the rotary control valve 14 exceeds θ1, the semi-center-open variable orifice V5 of the second control portion communicating to the pump 10 begins to close, while the center-closed variable orifice V7 communicating to the reservoir 11 begins to open, whereby the pressurized fluid in the fluid chamber 12A of the power cylinder 12 is drained to the reservoir 11 through the center-closed variable orifice V7. This causes the pressure in the fluid chamber 12A to decrease so as to increase the differential pressure between the both fluid chambers 12A and 12B, whereby steering operation of the steering wheel 13 can be assisted. At this time, the pressure in the fluid chamber 12A depends on the opening areas of the variable orifices V5 and V7 of the second control portion 24, while that in the fluid chamber 12B depends on the opening areas of the variable orifices V6 of the second control portion 24.

When the steering 13 is returned, the position of the valve shaft 21 relative to the valve body 22 comes back to the neutral position by the action of the torsion bar. In this state, since the center-closed variable orifices V7 and V8 are closed, the pressurized fluid in the fluid chamber 12B flows to the fluid chamber 12A through the semi-center-open variable orifices V6 and V5 when the force returning the steering wheel 13 acts on the piston from the side of the road wheels. This advantageously allows the steering wheel 13 to return smoothly.

Since the operation of the rotary control valve 14 when the valve shaft 21 is relatively rotated in the leftward direction as viewed in FIG. 3 is easily understood from the foregoing description, a detailed description thereof is omitted for the sake of brevity.

As described above, in the power steering apparatus according to the present invention, the differential pressure across the power cylinder 12 is maintained so as to be extremely low or substantially zero when the steering wheel 13 is at around the neutral position. Therefore, at around the neutral position of the steering wheel 13, the steering feeling is the same as that in the manual steering apparatus, so that the driver can definitely feel the neutral position of the steering wheel, because the rigidity of the steering wheel 13, i.e., the resistance to turn the same is enhanced at around the neutral position. This also enables the driver to feel the beginning of power assistance when the steering wheel 13 is turned in either direction beyond a certain angle θ1 from the neutral position.

Further, in the power steering apparatus according to the present invention, when the steering wheel 13 is returned with the rotary control valve 14 being in the neutral state, the two drain paths L7 and L8 of the second control portion 24 communicating with the reservoir 11 are closed by the center-closed variable orifices V7 and V8, while one of the fluid chambers 12A and 12B of the power cylinder 12 is brought into communication with the other thereof through the semi-center-open variable orifices V5 and V6 of the second control portion 24. Therefore, the pressurized fluid in one of the chambers 12A and 12B is smoothly supplied to the other thereof, so that the return of the steering wheel 13 can be improved.

Figure 9:
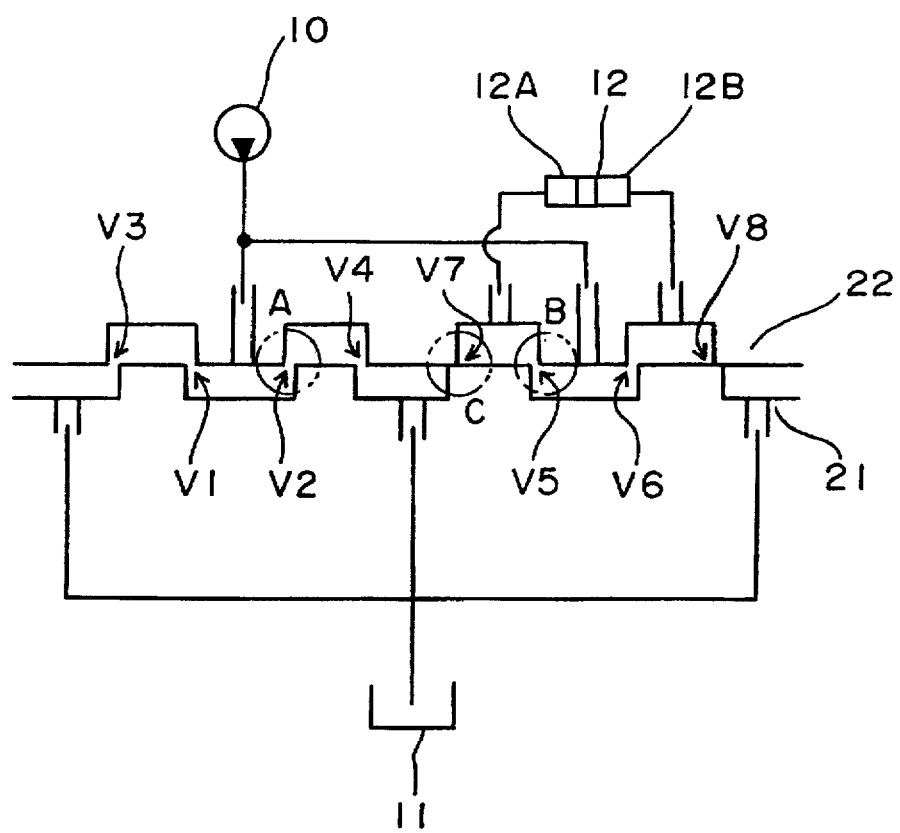
FIG. 9 is a diagram similar to FIG. 3, of the apparatus according to a second embodiment.
Figure 10:
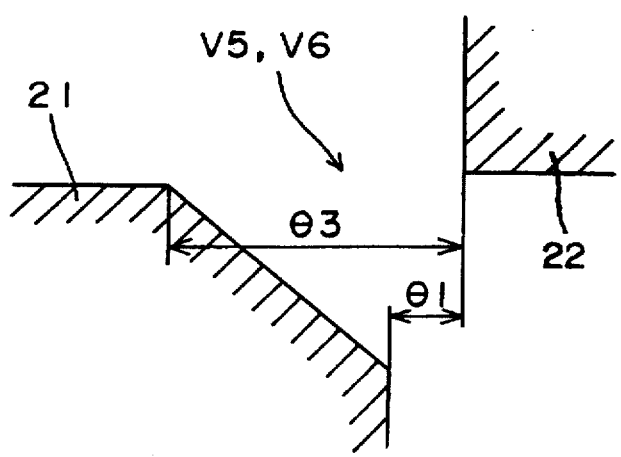
FIG. 10 is an enlarged view of the portion B' in FIG. 9.
Figure 11:
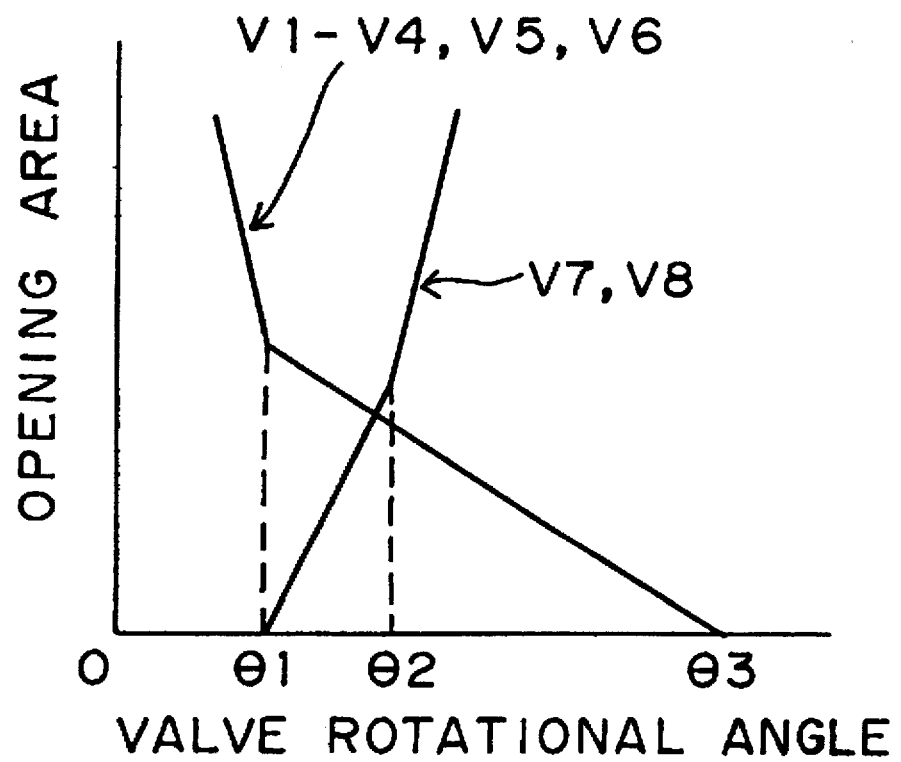
FIG. 11 is a graph showing the relationship between the relative rotational angle of the control valve and the effective opening areas of the variable orifices according to the second embodiment.

A second embodiment according to the present invention will now be described with reference to FIGS. 9–11 and FIG. 8. The entire configuration of the system is similar to that shown in FIG. 3. In this second embodiment, as shown in FIG. 9, variable orifices V5 and V6 are center-open variable orifices which have the same configuration as those V1–V4. Namely, each of the variable orifices V5 and V6 has its configuration as shown in FIG. 10. Therefore, as shown in FIG. 11, each of the variable orifices V5 and V6 is closed at the same rate as that of orifices V1–V4 as the relative valve rotation advances in either direction.

Figure 8:
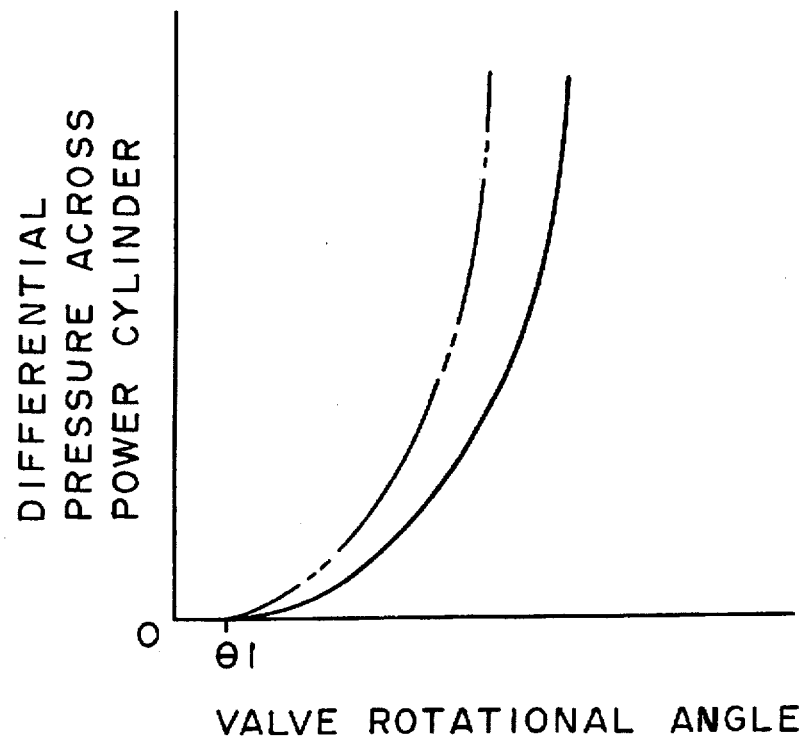
FIG. 8 is a graph showing the relationship between the relative rotational angle of the control valve and the differential pressure across the power cylinder.

With this configuration, when the steering wheel 13 is turned in either direction, the same steering feeling as in the manual steering apparatus is given to the driver until the relative valve rotation reaches θ1 in FIG. 8. However, because the variable orifices V5 and V6 are center-open variable orifices, the pressure increase exerted by the first control portion 23 is immediately applied to the power cylinder 12. This causes the differential pressure across the power cylinder 12 to increase faster than is done in the first embodiment as the relative valve rotation advances in either direction, as indicated by the phantom curved line in FIG. 8.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus having a fluid source supplying pressurized fluid, a power cylinder having a plurality of chambers, a rotary control valve responsive to the operation of a steering wheel and supplying said power cylinder with pressurized fluid from said fluid source, and a reservoir, said rotary control valve comprising:

a first control portion controlling the flow of pressurized fluid from said fluid source to said reservoir, said first control portion having at least one path connecting said fluid source and said reservoir, and said path including at least one center-open variable orifice which opens when said rotary control valve is in a neutral state;

a second control portion controlling the flow of pressurized fluid from said fluid source to said power cylinder, said second control portion having two supply paths communicating said fluid source respectively with the chambers of said power cylinder and two drain paths respectively communicating the chambers of said power cylinder with said reservoir, wherein each of said two supply paths includes a center-open variable orifice which opens when said rotary control valve is in the neutral state, while each of said two drain paths includes a center-closed variable orifice which closes when said rotary control valve is in the neutral state.

2. A power steering apparatus according to claim 1, wherein said fluid chambers of said power cylinder communicate with each other through said two supply paths of said second control portion when said rotary control valve is in the neutral state.

3. A power steering apparatus according to claim 1, wherein each of said variable orifices respectively formed in said two supply paths of said second control portion comprises a semi-center-open variable orifice having an opening area when said rotary control valve is in the neutral state.

4. A power steering apparatus according to claim 1, wherein said first control portion forms two supply paths communicating with said fluid source and two drain paths communicating with said reservoir, and each of said paths of said first control portion is formed with a center open variable orifice which opens when said rotary control valve is in the neutral state.

5. A power steering apparatus according to claim 1, further comprising:

a metering orifice located in a supply passage communicating said fluid source with said rotary control valve; and a flow rate control mechanism movable in response to a differential pressure across said metering orifice so as to maintain substantially constant a flow rate of pressurized fluid supplied to said rotary control valve from said fluid source.

6. A power steering apparatus according to claim 5, wherein said first control portion forms two supply paths communicating with said fluid source and two drain paths communicating with said reservoir, and each of said paths of said first control portion is formed with a center-open variable orifice which opens when said rotary control valve is in the neutral state.

7. A power steering apparatus having a fluid source for supplying pressurized fluid, a power cylinder having first and second chambers, a control valve responsive to the operation of a steering wheel and supplying said power cylinder with pressurized fluid from said fluid source, and a reservoir, wherein said control valve comprises:

a first control portion fluidically disconnected from said power cylinder and including a first variable orifice mechanism which gradually restricts the flow of fluid from said fluid source to said reservoir as said steering wheel is turned from a neutral position in either direction; and a second control portion fluidically connected to said power cylinder and including a second variable orifice mechanism which permits fluid to be supplied from said fluid source to said first and second chambers of said power cylinder while substantially preventing fluid from flowing from said first and second chambers of said power cylinder to said reservoir when said steering wheel is at around the neutral position and which supplies fluid from said fluids source to one of said first and second chambers of said power cylinder while permitting the flow of fluid from one of said first and second chambers of said power cylinder to said reservoir when said steering wheel is turned from the position around the neutral position in either direction.

8. A power steering apparatus according to claim 7, wherein said first variable orifice mechanism of said first control portion comprises four variable orifices all of which open to permit fluid to flow from said fluid source to said reservoir when said steering wheel is at the neutral position, and wherein said second variable orifice mechanism of said second control portion comprises two variable orifices which open to permit fluid to be supplied to both chambers of said power cylinder when said steering wheel is at around the neutral position and two variable orifices which substantially close to prevent fluid from flowing from both chambers of said power cylinder to said reservoir when said steering wheel is at around the neutral position.

* * * * *

UNITED STATES PATENT AND TRADEMARK OFFICE
CERTIFICATE OF CORRECTION

PATENT NO.    : 5,638,912
DATED         : June 17, 1997
INVENTOR(S)   : Kyosuke HAGA, et al.

It is certified that error appears in the above-indentified patent and that said Letters Patent is hereby corrected as shown below:

On the title page, Item [30], the Foreign Application Priority Data should read:

--Nov. 12, 1993   [JP]    Japan...........5-283337--

Signed and Sealed this

Ninth Day of September, 1997

Attest:

BRUCE LEHMAN

Attesting Officer        Commissioner of Patents and Trademarks